Oct. 23, 1956     W. H. ROBINSON     2,767,506
FLOAT
Filed Nov. 12, 1952
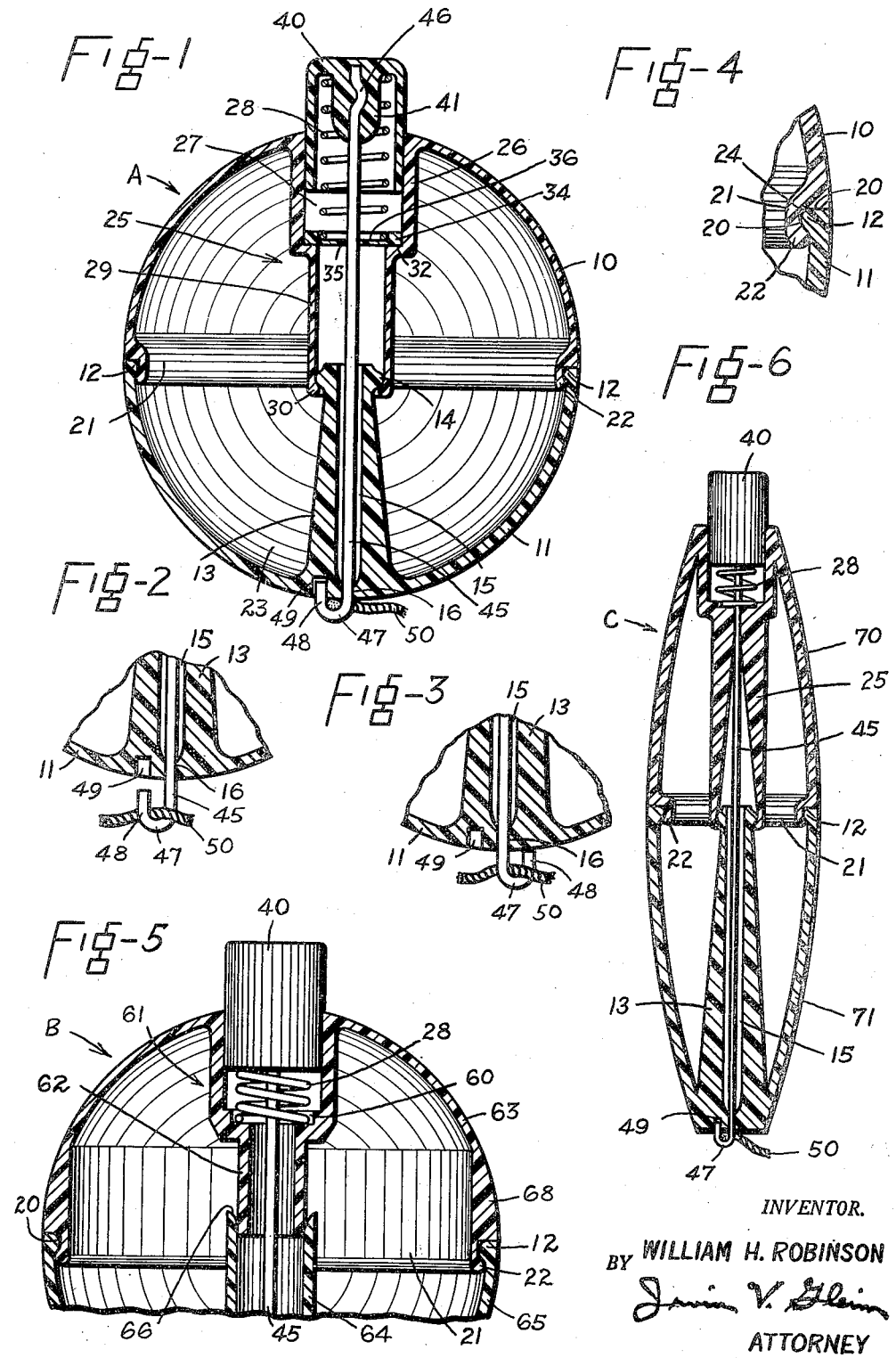
INVENTOR.
BY WILLIAM H. ROBINSON
ATTORNEY United States Patent Office 2,767,506
Patented Oct. 23, 1956

2,767,506

FLOAT

William H. Robinson, Miamisburg, Ohio

Application November 12, 1952, Serial No. 320,063

8 Claims. (Cl. 43—44.95)

This invention relates to floats and more particularly to floats such as are used for fishing lines, wires, surf lines, fishing nets, anchor markers, channel markers, and the like.

Floats of this kind have been designed so as to provide a float primarily to be used in casting or in still fishing and in general are constructed with a specific spring structure for holding the parts of the float together and to slidably or grippingly engage a fish line. In an attempt to preclude a fish line from becoming disengaged or whipping out of engagement with such floats, a socket is commonly provided to cooperate with a loop portion of the spring structure to engage the line. The practicability of such floats, however, is materially reduced by the frequent disengagement of the float from the fish line.

In order to prevent such disengagement, it is necessary that means should be provided for preventing the disengagement of the float from the fish line during fishing operations.

It is an object of the present invention to provide a float for a fishing line and the like with a self-alignment system which embraces novel means for positively locking the line, either slidably or grippingly to the float during fishing operations.

Another object of the invention is to provide such a float which may be of any desired size and configuration within the limits of the particular length and diameter of the line so that such float may meet the particular line requirements.

It is also an object of the invention to provide such a float formed from a pair of hollow members which are intrinsically adapted to be secured together to form a buoyant float body.

Further objects and objects relating to details of construction and advantages of use will more definitely appear from the detailed description to follow. Non-limiting structures constituting preferred embodiments of the invention as illustrated in the accompanying drawings form a part of the specification, in which:

Fig. 1 is an axial elevational view partly in cross section showing one form of float with a line in non-sliding engagement therewith, and constructed in accordance with the present invention;

Fig. 2 is a fragmentary view partly in cross-section, taken along the lower portion of the embodiment of the invention shown in Figure 1 and illustrating a line loop in extended position preliminarily embracing a line for subsequent non-sliding engagement with the float;

Fig. 3 is a fragmentary view partly in cross-section, taken along the lower portion of Figure 1 and illustrating the line held in sliding engagement;

Fig. 4 is an enlarged fragmentary detailed view partly in cross-section, taken along the circumference of Fig. 1;

Fig. 5 is an axial elevational fragmentary view partly in cross-section showing a modified form of float constructed in accordance with the invention; and Fig. 6 is an elevational view partly in cross-section showing a still further modified form of float constructed in accordance with the invention.

Referring in detail to the drawing wherein like numerals designate corresponding parts in all the figures, particular reference is made to Fig. 1 which is an embodiment of the present invention illustratively shown and designated by the reference character A, and includes a pair of hollow body members 10 and 11 which are preferably made of a light-weight material. In this specific embodiment, the body members 10 and 11 are constructed of a homogeneous plastic material, preferably formed to provide a lower or male hemisphere and an upper or female hemisphere respectively.

As will be noted by reference to Fig. 1, the hemisphere 11 is provided with an inwardly projecting annular bead 12 along the inner circumference thereof. Hemisphere 11 is also provided with an axially positioned sleeve member 13 having an outwardly extending bead 14 along the uppermost portion thereof. An orifice 15 extends along the longitudinal axis of sleeve 13 and terminates adjacent the lower portion thereof the remaining portion having an aperture 16 of reduced diameter formed therethrough.

As shown in Figs. 1 and 4, the hemisphere 10 is provided with an annular groove 20, such groove forming a downwardly depending lip portion or member 21, the lowermost portion of the lip 21 having an outwardly directed bead 22 formed integral therewith. Lip portion 21 and bead 22 are constructed to cooperate with the bead portion 12 of the hemisphere 11 to effect a sealing or clinching engagement of the respective hemispheres.

The hemisphere 10 is further provided with an integral axially positioned tube-like sleeve member shown generally at 25 and extending inwardly and projecting beyond the plane of the open end of the hemisphere 10. Sleeve member 25 has an enlarged tubular portion 26, extending from the inner surface of the hemisphere 10, to provide a chamber or pocket 27 for receiving and housing a coil spring 28. The remainder of the sleeve member 25 is of a reduced diameter indicated by the numeral 29 and terminates with an inturned annular lip portion 30.

As will be readily understood by reference to Figs. 1 and 4, the sealing or clinching engagement of the hemispheres 10 and 11 is effected by the interlocking of the bead 12 and lip portion 21 and the simultaneous interlocking of the bead 14 and lip portion 30 of the sleeve members 13 and 25 respectively. As shown in Fig. 4, as the hemispheres 10 and 11 are brought together to form the buoyant body or float A, the bead portion 22 will cam past bead portion 12 and upon further compression of the hemispheres the bead 12 will be received within the annular groove 20, thus effecting an interlocking or clinching engagement, forming a water tight seal to the inner air chamber 23. If a cemented joint between the two hemispheres is desired, a suitable adhesive may be applied at the juncture line of the hemispheres, in which case a portion of the adhesive will be retained in the peripheral space indicated at 24. Space 24 is available for this purpose by reason of the fact that groove 20 preferably has a relatively angular offset as opposed to the rounded contour of the bead 12.

Referring to the sleeve 25, the reduced diameter portion 29 provides a seat 32 that carries thereon a spring retaining washer 34. Washer 34 has a centrally located bore 35 and is recessed at 36 as shown in Fig. 1 to firmly receive and centrally locate the lower end of spring 28. Chamber 27 accommodates a hollow cup-like cap or plunger member 40 having an inner protuberance or projection 41. The upper end of spring 28 is received within the hollow cap or plunger member 40 in such a manner that the protuberance 41 projects within the upper coils thereof.

A line holding member 45 preferably has a bend or kink 46 at its upper end which is embedded in the protuberance 41 during the molding of cap member 40. Such a structure provides a rigid and non-rotatable connection to provide a unitary cap and line holding member assembly.

In order to assemble the float unit, the spring 28 is received within the hollow cap 40 and surrounding the line holding member 45, and thereafter the spring retaining washer 34 is positioned in the seat 32. Member 45 is then inserted through aperture 35 in washer 34 and through the aperture 15 in sleeve 13 and finally through aperture 16 in hemisphere 11. By depressing the cap member 40, member 45 will be caused to project outwardly of the sphere A at which time the outer end is formed into a hook 47. Hook 47 is so formed as to provide a parallel leg portion 48 adapted to be received within a suitable retaining aperture 49. From the above it can be seen that the provision of an independent coil spring which is maintained in self-alignment will provide a free moving and unobstructed cap operation. Moreover the two-point guiding suspension provided by the apertures 16 and 35 for the line holding member 45, together with the cap which is designed to have an outside diameter slightly less than the inside diameter of pocket 27 so as to provide a snug but sliding fit therewith, will effect a non-binding, self-aligning spring, line holding member and smooth cap or plunger like operation, thereby providing cooperating means for positively locking the line 50, either slidably or grippingly to the float, as desired, during fishing operations. Depending upon the geometry and desired size of certain floats manufactured in accordance with this invention, it has been found possible to eliminate the use of washer 35 without sacrificing the above mentioned self-aligning features. In such floats, the outside cylindrical portion of the cup-like cap or plunger 40 cooperates with the inner wall of pocket 27 and the aperture 16 to provide self-alignment of the spring and the line holding member.

In order to attach the float assembly A to a fishing line indicated at 50 during fishing operations, it is only necessary to depress the cap or plunger 40 inwardly a sufficient amount to cause the hook 47 to project as shown in Fig. 2. At this time the line can be received within the hook 47 and by releasing pressure on the cap 40, spring 28 will urge the hook portion in a direction to cause leg portion 48 to be received within aperture 49. Referring to Fig. 1 with the parts in the position as described, it can be seen that the fishing line will be firmly gripped by the hook 47 and thereby spring clamped to the float.

If desired, the float may be slidably adjusted to any point on the line without the need of detaching the float completely from the line. By depressing the cap a sufficient distance to enable the cap assembly to be turned, a subsequent directing of the hook away from the aperture 49 will be effected as shown in Fig. 3.

A modified form B of the invention is shown in Fig. 5 which is similarly constructed as described in connection with Figs. 1 to 4; however, in this embodiment, a seat 60 is integrally formed in the sleeve member 61. The portion 62 of sleeve 61 carried by the hemisphere 63 is adapted to be press fit within a tube like sleeve 64 carried by the hemisphere 65. The receiving end of the sleeve 64 is flared at 66 to assist in guiding the sleeves into fitting engagement. Moreover, the flared portion 66 provides an area to receive a suitable adhesive applied before assembly if desired.

The locking means for this modification is similar to that described for float A with the exception that the wall portion of hemisphere 63 adjacent the clinching means is somewhat thicker as indicated at 68 and has been found to provide a very commercially satisfactory lap, clinching or cemented joint whichever is desired.

Still another embodiment of the present invention is illustratively shown in Fig. 6 and designated by the reference character C, and includes a pair of hollow body members 70 and 71. Modified form C is similarly constructed as described in connection with the float shown in Fig. 5; however, in this embodiment the members 70 and 71 are of such a configuration and geometry that when assembled, the elongated float body shown is formed, while the sleeve members 13 and 25 have been provided with a cooperating bead and lip portion for interlocking engagement as described in connection with floats A and B.

The floats of the present invention may be made advantageously of two dissimilar materials, one of which is of resilient character and the other of rigid character. For example, with respect to the float shown in Fig. 1, the hemisphere 11 may be made advantageously of a rigid plastic material such as cellulose acetate, cellulose nitrate, polystyrene or the like material, while the hemisphere 10 may be made advantageously of a relatively softer plastic material, such as polyethylene, or the like resilient material, so that it may deform sufficiently to permit the lip portion 21, and the inturned annular lip portion 30 to pass over and clinch the annular bead 12 and the outwardly extending bead 14 respectively, whereby to effect clinching engagement with each other.

The cap member 40 may be made advantageously of a rigid material such as, for example, the materials of which the hemisphere 11 may be formed. Obviously, the cap member 40 as well as the hemisphere 11 may be made of rigid non-plastic material, but plastic materials are particularly useful in the practice of the present invention. It will be equally obvious to those skilled in the art that the hemisphere 11 may be made of resilient plastic material and the hemisphere 10 of rigid plastic material as well as vice-versa. Moreover, both hemispheres 10 and 11 may be formed of a similar plastic material, if desired.

While the floats of the present invention preferably take the form of a pair of hemispherical or elongated sections, other forms may be used if so desired. For example, the float body may assume or be given other geometric shapes or forms.

It will be understood that while there have been described herein and illustrated in the drawing certain specific embodiments of the present invention, it is not intended thereby to have this invention limited to or circumscribed by the particular details of construction, arrangement of parts, materials and methods herein disclosed or illustrated in the drawing, in view of the fact that this invention is susceptible to modification according to individual preference and conditions within the scope of the appended claims.

What is claimed is:

1. A float of the character described comprising a pair of substantially hemispherical members adapted to be clinchingly secured together to form a substantially spherical buoyant body, one of said members having an inwardly directed bead, formed integrally with the peripheral edge portion thereof, an annular lip formed integrally with the peripheral portion of the other of said members, and an outwardly directed bead formed at the free end of said lip and engageable beneath the inwardly directed bead, said lip having a groove in the outer face thereof forming an annular air space with said inwardly extending bead, each of said members having a sleeve-like self-locking projection, one of said projections extending inwardly and beyond the center of the substantially spherical body formed from said substantially spherical members, one of said projections being enlarged as it meets the inner surface of one of said substantially hemispherical members to provide a recess forming a socket for receiving a coil spring, a slidable cap member extending substantially over said spring and having an inner protuberance extending substantially within the coils of said spring providing self-alignment thereof, a cord attaching member mounted at one end within said protuberance of said cap member and passing through said sleeve-like projections, and said cord attaching member being provided with hook means at its opposite end.

2. A float according to claim 1 wherein one of said sections is made of a rigid material and the other of said sections is made of a relatively resilient material, whereby said section of relatively resilient material may deform in effecting clinching engagement with said section of rigid material.

3. A spherical float comprising in combination, a pair of substantially hemispherical coupling members secured together to form a buoyant body, one of said members having an inwardly directed bead, formed integrally with the peripheral edge portion thereof, an annular lip formed integrally with the peripheral portion of the other of said members, and an outwardly directed bead formed at the free end of said lip and engageable beneath the inwardly directed bead, said lip having a groove in the outer face thereof forming an annular air space with said inwardly extending bead, each of said coupling members having an axially positioned sleeve-like projection member, one of said projection members extending inwardly and substantially beyond the center of its substantially spherical body, one of said projection members having an inwardly extending bead along the circumference of its inner open end, the other of said projection member being provided with a lip portion along the circumference of its inner end, said bead and said lip portion being arranged for clinchingly locking said projection members together, one of said projection members being enlarged as it meets the inner surface of one of said substantially hemispherical members to provide a recess forming a socket and a seat for positioning a coil spring in axial alignment, a slidable cap member extending substantially over said spring and having an inner protuberance extending substantially within the coils of said spring, and a rod-like member having a kink at one end embedded in said protuberance of said cap member, said rod-like member extending through said spring and sleeve-like projection members and being provided with a hook means adapted to receive a cord at its opposite end, said cap member, said protuberance and said seat in said recess being cooperatively arranged to maintain said spring and said cap member in axial alignment.

4. A float of the character described comprising a pair of substantially hemispherical members adapted to be secured together to form a substantially spherical buoyant body, one of said members having an inwardly directed bead, formed integrally with the peripheral edge portion thereof, an annular lip formed integrally with the peripheral portion of the other of said members, and an outwardly directed bead formed at the free end of said lip and engageable beneath the inwardly directed bead, said lip having a groove in the outer face thereof forming an annular air space with said inwardly extending bead, each of said members having a sleeve-like self-locking projection, one of said projections extending inwardly and beyond the center of said substantially spherical body, one of its projections being enlarged as it meets the inner surface of one of said substantially hemispherical members to provide a recess forming a pocket for receiving a coil spring, a slidable cap member extending substantially over said spring and having an inner protuberance extending substantially within the coils of said spring providing self-alignment thereof, a cord attaching member mounted at one end within said protuberance of said cap member and passing through said sleeve-like projections, and said cord attaching member being provided with hook means at its opposite end.

5. A float in accordance with claim 1 wherein the substantially hemispherical member associated with said hook is provided with a blind hole adjacent said hook, said hole being of a diameter and depth to provide the inward movement of the bight portion of said hook whereby to hold a line in non-slipping engagement with said substantially hemispherical member.

6. A float in accordance with claim 1 wherein the hemispherical member associated with said hook is provided with a blind hole adjacent said hook, said hole being of a diameter and depth to provide the inward movement of the bight portion of said hook whereby to hold a line in non-slipping engagement with said hemispherical member, and wherein means is provided for maintaining said hook wholly without said blind hole.

7. A float of the character described comprising a pair of substantially hemispherical members adapted to be clinchingly secured together to form a substantially spherical buoyant body, one of said members having an inwardly directed bead, formed integrally with the peripheral edge portion thereof, an annular lip formed integrally with the peripheral portion of the other of said members, and an outwardly directed bead formed at the free end of said lip and engageable beneath the inwardly directed bead, said lip having a groove in the outer face thereof forming an annular air space with said inwardly extending bead, each of said members having a sleeve-like self-locking projection, one of said projections extending inwardly and beyond the center of its substantially spherical body, one of said projections being enlarged as it meets the inner surface of one of said substantially hemispherical members to provide a recess forming a socket for receiving a coil spring, a slidable cap member extending substantially over said spring and having an inner protuberance extending substantially within the coils of said spring providing self-alignment thereof, and a cord attaching member mounted at one end within said protuberance of said cap member and passing through said sleeve-like projections, said cord attaching member being provided with hook means at its opposite end, and means centrally aligning said spring in said socket.

8. A float of the character described comprising a pair of substantially hemispherical members adapted to be clinchingly secured to form together a substantially spherical buoyant body, one of said members having an inwardly directed bead, formed integrally with the peripheral edge portion thereof, an annular lip formed integrally with the peripheral portion of the other of said members, and an outwardly directed bead formed at the free end of said lip and engageable beneath the inwardly directed bead, said lip having a groove in the outer face thereof forming an annular air space with said inwardly extending bead, each of said members having a sleeve-like self-locking projection, one of said projections extending inwardly and beyond the center of its substantially spherical body, one of said projections being enlarged as it meets the inner surface of one of said substantially hemispherical members to provide a recess forming a socket for receiving a coil spring, a slidable cap member extending substantially over said spring and having an inner protuberance extending substantially within the coils of said spring providing self-alignment thereof, and a cord-attaching member mounted at one end within said protuberance of said cap member and passing through said sleeve-like projections, said cord-attaching member being provided with hook means at its opposite end, and means centrally aligning said spring in said socket, said means comprising a centrally apertured washer mounted in the lower end of said socket and having a centrally located bore in the upper face thereof for receiving the lower end of said spring.

References Cited in the file of this patent

UNITED STATES PATENTS

| 472,487 | Humbert | Nov. 3, 1891 |
| 514,034 | Redfield | Feb. 6, 1894 |
| 575,674 | Woodward | Jan. 19, 1897 |

(Other references on following page)

UNITED STATES PATENTS

| | | |
|---|---|---|
| 1,575,216 | Kuehn et al. | Mar. 2, 1926 |
| 1,622,831 | Kirkegaard | Mar. 29, 1927 |
| 2,231,270 | Huston (II) | Feb. 11, 1941 |
| 2,255,853 | Makus et al. | Sept. 16, 1941 |
| 2,280,457 | Suitcliffe | Apr. 21, 1942 |
| 2,376,958 | Chapman | May 29, 1945 |
| 2,415,692 | Huston | Feb. 11, 1947 |
| 2,496,334 | Chapman (II) | Feb. 7, 1950 |
| 2,627,693 | Wanner | Feb. 10, 1953 |
| 2,670,560 | Matras | Mar. 2, 1954 |

FOREIGN PATENTS

| | | |
|---|---|---|
| 457,034 | Canada | May 31, 1949 |